United States Patent
Zhao et al.

(10) Patent No.: US 10,422,967 B2
(45) Date of Patent: Sep. 24, 2019

(54) OPTICAL COUPLING APPARATUS AND METHOD

(71) Applicant: HUAWEI TECHNOLOGIES CO., LTD., Shenzhen, Guangdong (CN)

(72) Inventors: Qing Zhao, Shenzhen (CN); Xiaolu Song, Shenzhen (CN); Li Zeng, Shenzhen (CN); Ruiqiang Ji, Shenzhen (CN); Yanbo Li, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/036,723

(22) Filed: Jul. 16, 2018

(65) Prior Publication Data
US 2018/0321451 A1    Nov. 8, 2018

Related U.S. Application Data
(63) Continuation of application No. PCT/CN2016/071208, filed on Jan. 18, 2016.

(51) Int. Cl.
*G02B 6/42* (2006.01)
*G02B 6/36* (2006.01)

(52) U.S. Cl.
CPC ......... *G02B 6/4206* (2013.01); *G02B 6/3608* (2013.01); *G02B 6/42* (2013.01); *G02B 6/4214* (2013.01); *G02B 6/4249* (2013.01)

(58) Field of Classification Search
CPC .................................................. G02B 6/4206
See application file for complete search history.

(56) References Cited

U.S. PATENT DOCUMENTS

| | | | |
|---|---|---|---|
| 5,761,181 A | * 6/1998 | Nunnally | G11C 8/005 369/112.27 |
| 8,534,927 B1 | 9/2013 | Barwicz et al. | |

(Continued)

FOREIGN PATENT DOCUMENTS

| | | |
|---|---|---|
| CA | 2379403 A1 | 2/2001 |
| CN | 1370285 A | 9/2002 |

(Continued)

OTHER PUBLICATIONS

Tymon Barwicz et al, Photonic Packaging in High-Throughput Microelectronic Assembly Lines for Cost-Efficiency and Scalability. 2015 Optical Society of America, 3 pages.

(Continued)

*Primary Examiner* — Sung H Pak
*Assistant Examiner* — Hoang Q Tran
(74) *Attorney, Agent, or Firm* — Womble Bond Dickinson (US) LLP (57) ABSTRACT

An optical coupling apparatus and method are described. An embodiment of an optical coupling apparatus may include a first optical chip, a second optical chip, and an optical writing waveguide block. In the apparatus, the first optical chip is coupled to the optical writing waveguide block in a first coupling manner, and the second optical chip is coupled to the optical writing waveguide block in a second coupling manner. Furthermore, in the apparatus, the first optical chip is optically interconnected to the second optical chip by using the optical writing waveguide block. Compatibility between a plurality of coupling manners is therefore enabled by using the technical solutions described herein.

19 Claims, 5 Drawing Sheets

(56) References Cited

U.S. PATENT DOCUMENTS

| 9,459,177 B1* | 10/2016 | Dong | G01M 11/30 |
|---|---|---|---|
| 2002/0012501 A1* | 1/2002 | Tang | G02B 6/305 |
| | | | 385/43 |
| 2005/0249256 A1 | 11/2005 | He | |
| 2008/0226222 A1 | 9/2008 | Kim et al. | |
| 2009/0317035 A1 | 12/2009 | Aoki et al. | |
| 2010/0134874 A1 | 6/2010 | Ozeki | |
| 2011/0129231 A1 | 6/2011 | Fiorentino et al. | |

FOREIGN PATENT DOCUMENTS

| CN | 101652711 A | 2/2010 |
|---|---|---|
| EP | 1378777 A2 | 1/2004 |
| JP | 2003248135 | 9/2003 |

OTHER PUBLICATIONS

N. Lindenmann et al, Photonic wire bonding: a novel concept for chipscale interconnects. Jul. 30, 2012 / vol. 20, No. 16 / Optics Express, 11 pages.

* cited by examiner

OPTICAL COUPLING APPARATUS AND METHOD

CROSS-REFERENCE TO RELATED APPLICATIONS

This application is a continuation of International Application No. PCT/CN2016/071208, filed on Jan. 18, 2016. The disclosure of the aforementioned application is hereby incorporated by reference in its entirety.

TECHNICAL FIELD

The present disclosure relates to the field of optical fiber communications technologies, and in particular, to an optical coupling apparatus and method.

BACKGROUND

With development of communications technologies, requirements on function and performance of communications systems are becoming higher. An optical chip implements optical-to-electric signal conversion and electric-to-optical signal conversion, and an optical fiber implements low-loss and long-distance transmission. Optical signal transmission between different optical chips or between an optical chip and an optical fiber requires use of a complex optical coupling structure. Therefore, the optical chip is a key technology for development of optical communications, and an optical coupling technology of the optical chip is one of the bottlenecks that restricts development of an optical chip technology.

Some requirements on optical chip coupling include: (1) compatibility between "chip-optical fiber" coupling and "chip-chip" coupling; (2) compatibility between coupling manners such as an Edge coupler (EC), a Grating Coupler (GC), and an Adiabatic Coupler (AC); (3) high density: a single optical fiber connector includes not less than 84 channels, and density is not less than 5.25 channels/mm$^2$; (4) single-mode or multi-mode signal transmission; and (5) a capability of implementing automatic, efficient, and high-precision optical encapsulation, and reducing an optical signal insertion loss.

In the prior art, none of a "Pitch Reducing Optical Fiber Array (PROFA)" solution used by Chiral Inc., an "optical PIN" solution proposed by the Photonics Electronics Technology Research Association (PETRA), a "polymer optical waveguide plate" solution used by IBM, a "Photonics Wire Bonding (PWB)" solution proposed by the Karlsruhe Institute of Technology (KIT), or the like can completely satisfy the above noted requirements on the optical chip coupling, and in particular, can satisfy compatibility between a plurality of coupling manners.

SUMMARY

Embodiments of the present disclosure provide an optical coupling apparatus and method, to satisfy compatibility between a plurality of coupling manners in optical chip coupling. To achieve the foregoing objective, the following technical solutions are used in the embodiments of the present disclosure:

According to a first aspect, an embodiment of the present disclosure provides an optical coupling apparatus, including: a first optical chip, a second optical chip, and an optical writing waveguide block, where the first optical chip is coupled to the optical writing waveguide block in a first coupling manner, and the second optical chip is coupled to the optical writing waveguide block in a second coupling manner; and the first optical chip is optically interconnected to the second optical chip using the optical writing waveguide block.

In this embodiment of the present disclosure, an optical writing waveguide block may be coupled to an optical chip in a plurality of coupling manners, thereby enabling coupling between optical chips and compatibility between the plurality of coupling manners.

With reference to the first aspect, in a first possible embodiment, the first coupling manner and the second coupling manner each include any one or more of an adiabatic coupler AC, a grating coupler GC, or an edge coupler EC.

In this embodiment of the present disclosure, an optical chip may be coupled to an optical writing waveguide block in a plurality of coupling manners, thereby enabling compatibility between the plurality of coupling manners.

With reference to the first aspect or the first possible embodiment of the first aspect, in a second possible embodiment, the optical coupling apparatus further includes an electric substrate; the first optical chip and the second optical chip are disposed on a surface of the electric substrate; and the first optical chip is electrically interconnected to the electric substrate, and the second optical chip is electrically interconnected to the electric substrate.

With reference to the first aspect and the first possible embodiment or the second possible embodiment of the first aspect, in a third possible embodiment, the optical writing waveguide block is at least partially disposed inside the electric substrate.

With reference to any one of the first aspect or the first possible embodiment to the third possible embodiment of the first aspect, in a fourth possible embodiment, the optical writing waveguide block is disposed on an upper surface of the first optical chip and/or the second optical chip.

With reference to any one of the first aspect or the first possible embodiment to the fourth possible embodiment of the first aspect, in a fifth possible embodiment, the optical writing waveguide block is at least partially disposed between the first optical chip and the second optical chip.

According to a second aspect, an embodiment of the present disclosure provides an optical coupling apparatus, including: an optical chip, an optical writing waveguide block, and an optical fiber, where the optical chip is coupled to the optical writing waveguide block in a first coupling manner, and the optical fiber is coupled to the optical writing waveguide block in a second coupling manner; and the optical chip is optically interconnected to the optical fiber by using the optical writing waveguide block.

In this embodiment of the present disclosure, an optical writing waveguide block may be separately coupled to an optical chip and an optical fiber in different coupling manners, thereby enabling coupling between an optical chip and an optical fiber and compatibility between a plurality of coupling manners.

With reference to the second aspect, in a first possible embodiment, the first coupling manner includes any one or more of an adiabatic coupler AC, a grating coupler GC, or an edge coupler EC.

In this embodiment of the present disclosure, an optical chip may be coupled to an optical writing waveguide block in a plurality of coupling manners, thereby enabling compatibility between the plurality of coupling manners.

With reference to the second aspect or the first possible embodiment of the second aspect, in a second possible embodiment, the second coupling manner includes the EC.

With reference to the second aspect or the first possible embodiment or the second possible embodiment of the second aspect, in a third possible embodiment, the optical coupling apparatus further includes an electric substrate; and the optical chip is disposed on a surface of the electric substrate, and the optical chip is electrically interconnected to the electric substrate.

With reference to any one of the second aspect or the first possible embodiment to the third possible embodiment of the second aspect, in a fourth possible embodiment, the optical writing waveguide block is at least partially disposed on an upper surface of the optical chip.

According to a third aspect, an embodiment of the present disclosure provides an optical coupling method, including: emitting an optical signal from a first optical chip, and coupling the optical signal to an optical writing waveguide block in a first coupling manner; and emitting the optical signal from the optical writing waveguide block, and coupling the optical signal to a second optical chip in a second coupling manner.

With reference to the third aspect, in a first possible embodiment, the first coupling manner and the second coupling manner each include any one or more of an adiabatic coupler AC, a grating coupler GC, or an edge coupler EC.

According to a fourth aspect, an embodiment of the present disclosure provides an optical coupling method, including: emitting an optical signal from an optical chip, and coupling the optical signal to an optical writing waveguide block in a first coupling manner; and emitting the optical signal from the optical writing waveguide block, and coupling the optical signal to an optical fiber in a second coupling manner; or, emitting an optical signal from an optical fiber, and coupling the optical signal to an optical writing waveguide block in a first coupling manner; and emitting the optical signal from the optical writing waveguide block, and coupling the optical signal to an optical chip in a second coupling manner.

With reference to the fourth aspect, in a first possible embodiment, the first coupling manner includes any one or more of an adiabatic coupler AC, a grating coupler GC, or an edge coupler EC.

In this embodiment of the present disclosure, in an optical writing waveguide block, coupling between optical chips and coupling between an optical chip and an optical fiber can be implemented in different coupling manners, thereby enabling compatibility between a plurality of coupling manners. A requirement for high density is satisfied by using a multi-core optical fiber. Single-mode or multi-mode signal transmission and efficient and high-precision encapsulation are implemented using an optical writing waveguide technology.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following describes the technical solutions in the embodiments of the present disclosure with reference to the accompanying drawings in the embodiments of the present disclosure.

The term "and/or" in this specification describes only an association relationship for describing associated objects and represents that three relationships may exist. For example, A and/or B may represent the following three cases: Only A exists, both A and B exist, and only B exists. "Plurality of" in this document represents two or more.

The embodiments of the present disclosure relate to an optical writing waveguide technology and a multi-core optical fiber technology. The following briefly describes the two technologies.

Figure 1:
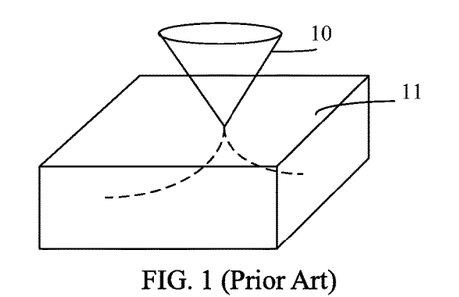
FIG. 1 is a schematic structural diagram of an optical writing waveguide apparatus in the prior art.

FIG. 1 is a schematic structural diagram of an optical writing waveguide apparatus in the prior art. As shown in FIG. 1, the optical writing waveguide apparatus includes a laser 10 and a waveguide substrate 11. The laser 10 may be a femtosecond laser, and a material of the waveguide substrate 11 may include glass, crystal, or the like. Specifically, the femtosecond laser focuses on a point inside a waveguide substrate, to increase a refractive index at the point, and form an optical waveguide by connecting points to form a line. For example, dashed lines in FIG. 1 are optical waveguides that are formed. A waveguide substrate for forming an optical waveguide is referred to as an optical writing waveguide block. The optical writing waveguide block may support single-mode or multi-mode optical signal transmission.

Figure 2:
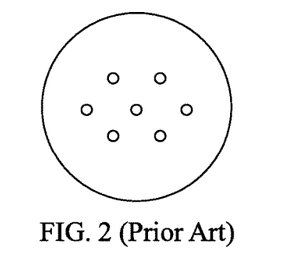
FIG. 2 is a schematic structural diagram of a multi-core optical fiber in the prior art.

FIG. 2 is a schematic structural diagram of a multi-core optical fiber in the prior art. As shown in FIG. 2, in the multi-core optical fiber, a diameter of a cladding optical fiber may be customized or fixed to 125 μm, and a core quantity may be 4, 7, 19, or the like, for example, 7 in FIG. 2. Each core is an independent channel, and may support a single mode or few modes. Compared with a single-core optical fiber, the multi-core optical fiber has an advantage of high channel density.

Figure 3:
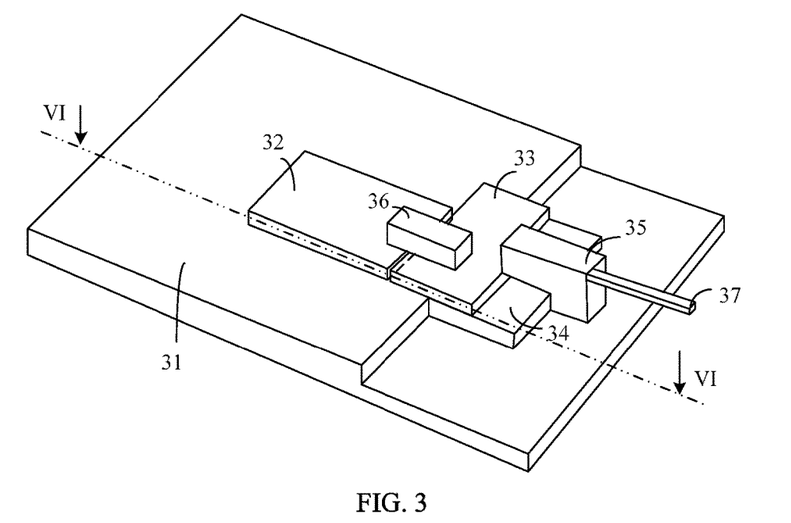
FIG. 3 is a schematic structural diagram of an optical coupling apparatus according to an embodiment of the present disclosure.

FIG. 3 is a schematic structural diagram of an optical coupling apparatus according to an embodiment of the present disclosure. As shown in FIG. 3, the optical coupling apparatus includes an electric substrate 31, optical chips 32, 33, and 34, optical writing waveguide blocks 35 and 36, and an optical fiber 37. The electric substrate 31 is configured to provide a power supply or an electric signal to the optical chips. The optical chips 32, 33, and 34 have one or more optical couplers, to send or receive an optical signal. The optical writing waveguide blocks 35 and 36 have an optical waveguide, and two ends of the optical waveguide may be connected to the optical chips or the optical fiber, to implement an optical interconnection between optical chips or between an optical chip and an optical fiber. The optical chips 32, 33, and 34 are disposed on an upper surface of the electric substrate 31, and are electrically interconnected to the electric substrate 31 by means of reflow soldering, wire bonding, or the like. Optionally, the optical chips 33 and 34 may further form one optical chip. The optical fiber 37 may be a multi-core optical fiber. If the optical fiber 37 includes 12 optical fiber arrays and each optical fiber array has seven cores, 84-channel optical coupling can be implemented. Assuming that a cross sectional area of an optical writing waveguide block and a size of a standard MT connector are the same, and are both 2.5 mm×6.4 mm, optical coupling density may reach 5.25 channels/mm².

In this embodiment of the present disclosure, a requirement for high density of optical coupling is satisfied by using the multi-core optical fiber.

Figure 4A:
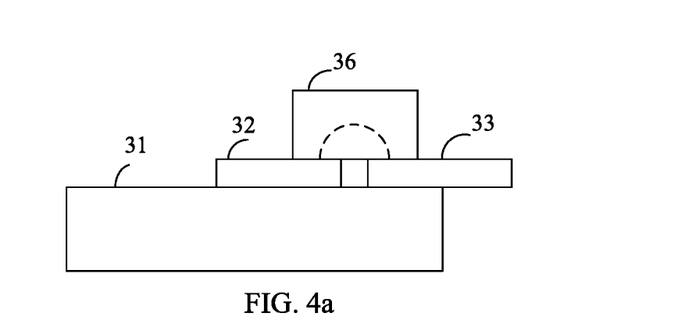
FIG. 4a is a sectional view, along a VI-VI line, of a part of the optical coupling apparatus shown in FIG. 3.

FIG. 4a is a sectional view, along a VI-VI line, of a part of the optical coupling apparatus shown in FIG. 3. FIG. 4a is a schematic structural diagram of coupling between optical chips according to an embodiment of the present disclosure. Specifically, a manner of coupling between the optical chip 32 and the optical writing waveguide block 36 or between the optical chip 33 and the optical writing waveguide block 36 includes any one or more of an AC, a GC, or an EC. For example, the optical chip 32 is coupled to the optical writing waveguide block 36 by using the GC and/or the AC, and the optical chip 33 is coupled to the optical writing waveguide block 36 by using the GC and/or the AC. Alternatively, the optical chip 32 is coupled to the optical writing waveguide block 36 by using the AC and/or the GC, and the optical chip 33 is coupled to the optical writing waveguide block 36 by using the EC. Alternatively, the optical chip 32 is coupled to the optical writing waveguide block 36 by using the EC, and the optical chip 33 is also coupled to the optical writing waveguide block 36 by using the EC. Coupling between an optical chip and an optical writing waveguide block is essentially coupling between an optical waveguide in the optical chip and an optical waveguide in the optical writing waveguide block. An example in which the optical chip 32 is coupled to the optical writing waveguide block 36 by using the GC, and the optical chip 33 is coupled to the optical writing waveguide block 36 by using the AC is used for description. An optical signal is emitted from the GC on the optical chip 32, and after being coupled, enters an optical waveguide in the optical writing waveguide block 36. The optical signal is transmitted along the optical waveguide in the optical writing waveguide block 36, and after being coupled by using the AC, enters the optical chip 33.

Figure 4B:
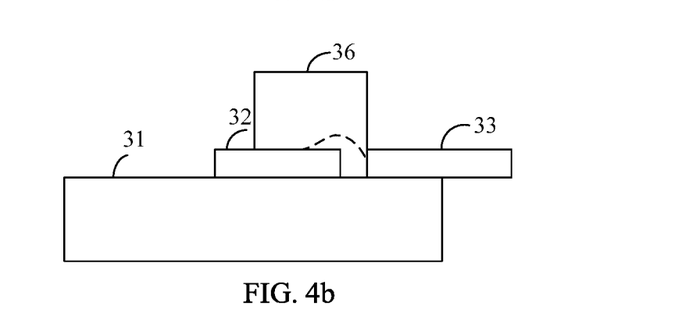
FIG. 4b is a schematic structural diagram of coupling between optical chips according to an embodiment of the present disclosure.

FIG. 4b is a schematic structural diagram of coupling between optical chips according to an embodiment of the present disclosure. As shown in FIG. 4b, the optical writing waveguide block 36 may be further partially disposed between the optical chips 32 and 33, and partially located above the optical chip 32. Specifically, the optical chip 32 is coupled to the optical writing waveguide block 36 by using the AC and/or the GC, and the optical chip 33 is coupled to the optical writing waveguide block 36 by using the EC. Optionally, the optical writing waveguide block 36 may be completely disposed between the optical chips 32 and 33. Specifically, the optical chip 32 is coupled to the optical writing waveguide block 36 by using the EC, and the optical chip 33 is also coupled to the optical writing waveguide block 36 by using the EC.

Figure 5A:
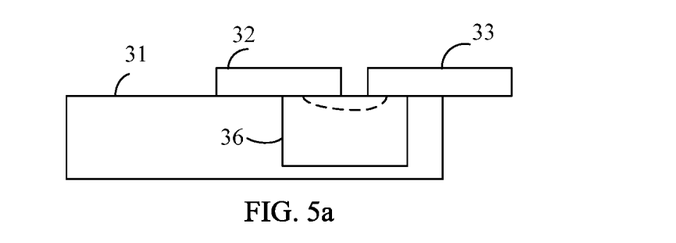
FIG. 5a is a schematic structural diagram of coupling between optical chips according to an embodiment of the present disclosure.
Figure 5B:
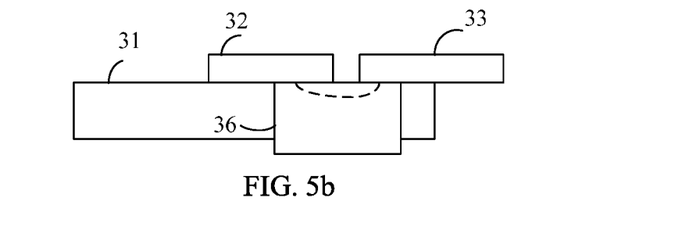
FIG. 5b is a schematic structural diagram of coupling between optical chips according to an embodiment of the present disclosure.

FIG. 5a and FIG. 5b each are a schematic structural diagram of coupling between optical chips according to an embodiment of the present disclosure. As shown in FIG. 5a and FIG. 5b, the optical writing waveguide block 36 may be disposed below the optical chips 32 and 33, that is, inside the electric substrate 31. Specifically, a hole or a slot may be formed on the electric substrate 31, and then the optical writing waveguide block 36 may be embedded into the hole or the slot. As shown in FIG. 5a, the optical writing waveguide block 36 may be completely disposed inside the electric substrate 31. As shown in FIG. 5b, the optical writing waveguide block 36 may alternatively protrude from a lower surface of the substrate. Specifically, the optical chip 32 is coupled to the optical writing waveguide block 36 by using the GC and/or the AC, and the optical chip 33 is coupled to the optical writing waveguide block 36 by using the GC and/or the AC.

Figure 6A:
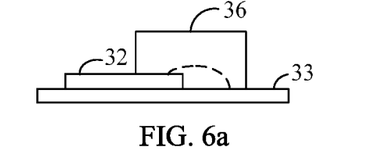
FIG. 6a is another schematic structural diagram of coupling between optical chips according to an embodiment of the present disclosure.
Figure 6B:
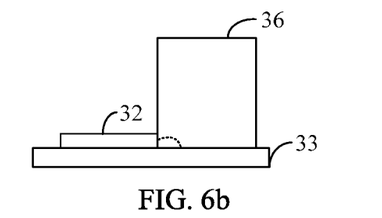
FIG. 6b is another schematic structural diagram of coupling between optical chips according to an embodiment of the present disclosure.

FIG. 6a and FIG. 6b each are another schematic structural diagram of coupling between optical chips according to an embodiment of the present disclosure. As shown in FIG. 6a and FIG. 6b, 3D electrical encapsulation may be performed on the optical chip 32 and the optical chip 33, and the optical chip 32 may be partially or completely located above the optical chip 33. As shown in FIG. 6a, the optical writing waveguide block 36 is partially disposed above the optical chip 32, and partially located above the optical chip 33. Specifically, the optical chip 32 is coupled to the optical writing waveguide block 36 by using the AC and/or the GC, and the optical chip 33 is coupled to the optical writing waveguide block 36 by using the AC and/or the GC. As shown in FIG. 6b, the optical writing waveguide block 36 is located above the optical chip 33. Specifically, the optical chip 33 is coupled to the optical writing waveguide block 36 by using the AC and/or the GC, and the optical chip 32 is coupled to the optical writing waveguide block 36 by using the EC.

In this embodiment of the present disclosure, optical coupling between optical chips is performed by using an optical writing waveguide block. Any one or more coupling manners of the AC, the GC, or the EC are used in an optical writing waveguide block, and compatibility is high.

Figure 7:
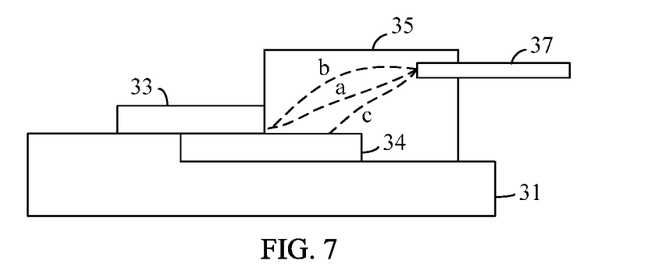
FIG. 7 is a sectional view, along a VI-VI line, of a part of the optical coupling apparatus shown in FIG. 3.

FIG. 7 is a sectional view, along the VI-VI line, of a part of the optical coupling apparatus shown in FIG. 3. FIG. 7 is a schematic structural diagram of coupling between an optical chip and an optical fiber according to an embodiment of the present disclosure. As shown in FIG. 7, a manner of coupling between the optical chip 33 and the optical writing waveguide block 35 or between the optical chip 34 and the optical writing waveguide block 35 includes the EC, the GC, the AC, or the like. A stacking relationship between the optical chip 33 and the optical chip 34 forms 3D electrical encapsulation. An overlapping area between the optical chip 33 and the optical chip 34 is not limited. The 3D electrical encapsulation is performed on the optical chip 33 and the optical chip 34, and optical signals of the two chips may be separately coupled to the optical fiber 37. Optionally, the optical chip 33 and the optical chip 34 may be further coupled to each other, for example, as shown in FIG. 6a and FIG. 6b. The optical fiber 37 may be a multi-core optical fiber. The optical fiber 37 is coupled to the optical writing waveguide block 35 in the EC coupling manner. The optical chip 33 may be coupled to the optical writing waveguide block 35 by means of EC coupling, and the optical chip 34 may be coupled to the optical writing waveguide block 35 in any one or more coupling manners of the EC, the GC, or the AC. Coupling between an optical fiber and an optical writing waveguide block is essentially coupling between the optical fiber and an optical waveguide in the optical writing waveguide block. Coupling between an optical chip and an optical writing waveguide block is essentially coupling between an optical waveguide in the optical chip and an optical waveguide in the optical writing waveguide block. For example, one end of each of optical waveguides a, b, and c is coupled to the optical fiber 37 by using the EC, the other end of the optical waveguide a is coupled to the optical chip 33 by using the EC, the other end of the optical waveguide b is coupled to the optical chip 34 by using the GC, and the other end of the optical waveguide c is coupled to the optical chip 34 by using the AC. Specifically, an optical signal is emitted from the EC coupling in the optical chip 33, enters the optical waveguide a, and is incident into the optical fiber 37 by using the optical waveguide a. An optical signal is emitted from the GC coupling in the optical chip 34, enters the optical waveguide b, and is incident into the optical fiber 37 by using the optical waveguide b. An optical signal is emitted from the AC coupling in the optical chip 34, enters the optical waveguide c, and is incident into the optical fiber 37 by using the optical waveguide c.

Figure 8:
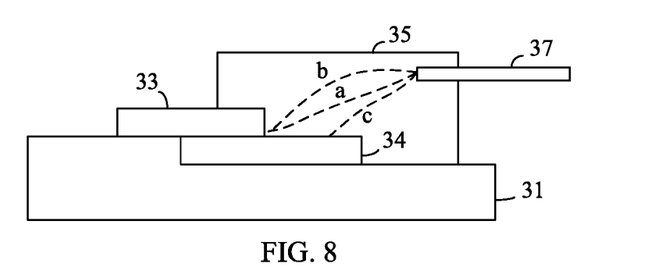
FIG. 8 is a schematic structural diagram of coupling between an optical chip and an optical fiber according to an embodiment of the present disclosure.

FIG. 8 shows another implementation of a structure of coupling between an optical chip and an optical fiber. As shown in FIG. 8, a part of the optical writing waveguide block 35 may be located above the optical chip 33. Therefore, the optical chip 33 may be further coupled to the optical writing waveguide block 35 in the AC or GC coupling manner.

In this embodiment of the present disclosure, optical coupling between an optical chip and an optical fiber is performed by using an optical writing waveguide block. Any one or more coupling manners of the AC, the GC, or the EC are used in an optical writing waveguide block, and compatibility is high.

The following describes principles of different coupling manners such as the GC, the AC, and the EC. Coupling between an optical chip and an optical writing waveguide block may include the GC, the AC, and EC, and coupling between an optical fiber and an optical writing waveguide block includes EC.

Figure 9:
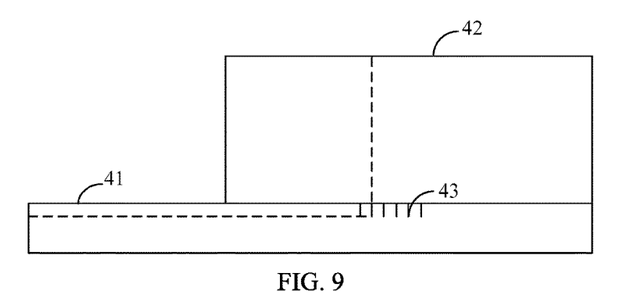
FIG. 9 is a schematic structural diagram of GC coupling between an optical chip and an optical writing waveguide block according to an embodiment of the present disclosure.

FIG. 9 is a schematic structural diagram of GC coupling between an optical chip and an optical writing waveguide block according to an embodiment of the present disclosure. As shown in FIG. 9, an optical chip 41 is coupled to an optical writing waveguide block 42 by using a GC. After being refracted from an optical waveguide in the optical chip 41 by using a grating 43, an optical signal is emitted in a manner of being perpendicular to a surface of the optical chip 41, and incident into an optical waveguide in the optical writing waveguide block 42. In a process of writing an optical waveguide, a parameter of the optical waveguide may be flexibly designed. Specifically, the optical waveguide may be designed to have different inclination angles and/or bending radians, or the like, to match different wavelengths and/or gratings. For example, in one optical chip, there are a plurality of gratings, and coupled parts between an optical waveguide and the gratings may be designed, for the different gratings, to have different inclination angles and/or bending radians.

Figure 10:
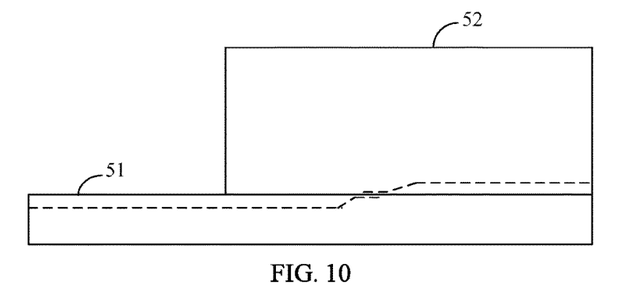
FIG. 10 is a schematic structural diagram of AC coupling between an optical chip and an optical writing waveguide block according to an embodiment of the present disclosure.

FIG. 10 is a schematic structural diagram of AC coupling between an optical chip and an optical writing waveguide block according to an embodiment of the present disclosure. As shown in FIG. 10, an optical chip 51 is coupled to an optical writing waveguide block 52 by using an AC. An optical signal enters an optical waveguide in the optical writing waveguide block 52 from an optical waveguide in the optical chip 51 in a manner of evanescent wave coupling. In a process of writing an optical waveguide, a parameter of the optical waveguide may be flexibly designed. Specifically, an optical waveguide in an optical writing waveguide block may be designed to have a two-dimensional taper structure, and the optical waveguide has a wedge structure in a direction perpendicular to a light propagation direction. In addition, relative to the light propagation direction, wedge angles of convergence in a horizontal direction and a longitudinal direction may be the same or different. In this embodiment of the present disclosure, an optical waveguide is designed to have the two-dimensional taper structure and the wedge structure, so that difficulty in optical chip coupling waveguide designing and processing can be reduced.

Figure 11:
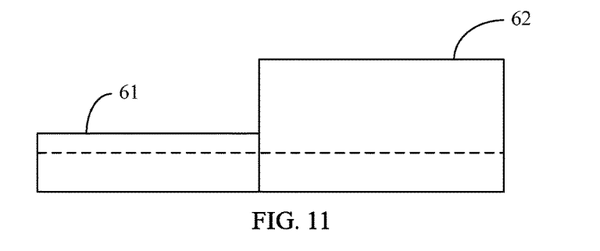
FIG. 11 is a schematic structural diagram of EC coupling between an optical chip and an optical writing waveguide block according to an embodiment of the present disclosure.

FIG. 11 is a schematic structural diagram of EC coupling between an optical chip and an optical writing waveguide block according to an embodiment of the present disclosure. As shown in FIG. 11, an optical chip 61 is coupled to an optical writing waveguide block 62 in an EC coupling manner. An optical signal is directly incident into an optical waveguide in the optical writing waveguide block 62 from an optical waveguide in the optical chip 61. In a process of writing an optical waveguide, a parameter of the optical waveguide may be flexibly designed. Specifically, the optical waveguide may be designed to have a taper structure having spotsizes of different sizes, to match a size of an EC spotsize of an optical chip. In this embodiment of the present disclosure, an optical waveguide is designed to have the taper structure having the spotsizes of different sizes, to adapt to different application scenarios, and increase efficiency of optical coupling.

Figure 12:
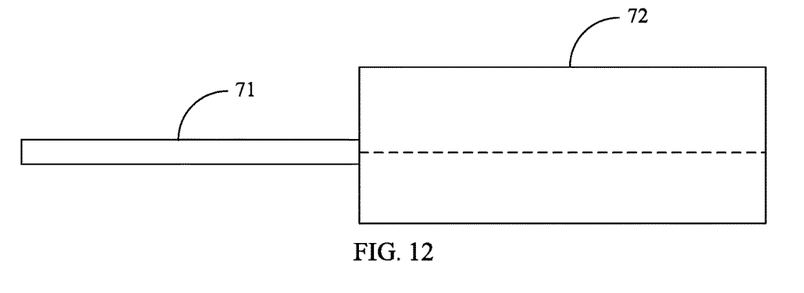
FIG. 12 is a schematic structural diagram of EC coupling between an optical fiber and an optical writing waveguide block according to an embodiment of the present disclosure.

FIG. 12 is a schematic structural diagram of EC coupling between an optical fiber and an optical writing waveguide block according to an embodiment of the present disclosure. As shown in FIG. 12, an optical fiber 71 is coupled to an optical writing waveguide block 72 in an EC coupling manner. A principle of the EC coupling between the optical fiber and the optical writing waveguide block is similar to a principle of the EC coupling between the optical chip and the optical writing waveguide block, and details are not described herein again.

Dashed lines in FIG. 9 to FIG. 12 are optical waveguides. An optical waveguide in an optical chip may be formed in a chip making process by using processes such as deposition, etching, and mixing. An optical waveguide in an optical writing waveguide block may be formed by using the method shown in FIG. 1.

The following describes encapsulation processes for coupling between optical chips and coupling between an optical chip and an optical fiber. FIG. 4a and FIG. 7 are respectively used as examples for description.

An encapsulation process for coupling between the optical chip 32 and the optical chip 33 shown in FIG. 4a is as follows: First, the optical chips 32 and 33 are electrically interconnected to the electric substrate 31 by means of reflow soldering, wire bonding, or the like. Then, after alignment at a mark point, a waveguide substrate (that is, a structure of the optical writing waveguide block 36 before an optical waveguide is formed) is secured on the optical chips 32 and 33 by means of chip mounter mounting, gluing, soldering, or the like. Finally, the optical waveguide, that is, the dashed line in FIG. 4a, may be written by means of machine vision and under the control of a high-precision platform.

Specifically, an operation principle of the machine vision is: An imaging system automatically identifies and records location coordinates, and then helps to locate the optical writing waveguide block. Precision is 500 nm. An operation principle of the high-precision platform is: An air bearing is used, a waveguide substrate can be precisely controlled to move, location precision of a waveguide is 50 nm, and comprehensive locating precision of the platform is approximately 550 nm.

Figure 13A:
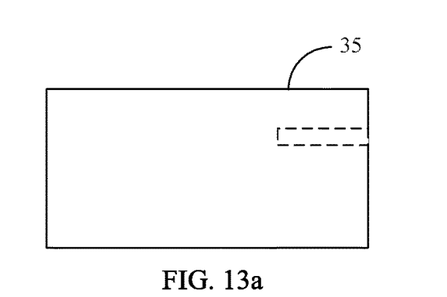
FIG. 13a, FIG. 13b, FIG. 13c, and FIG. 13d are a schematic diagram of an encapsulation process for coupling between an optical fiber and an optical chip according to an embodiment of the present disclosure.
Figure 13B:
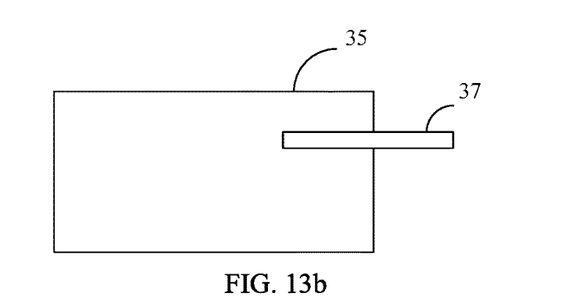
Figure 13C:
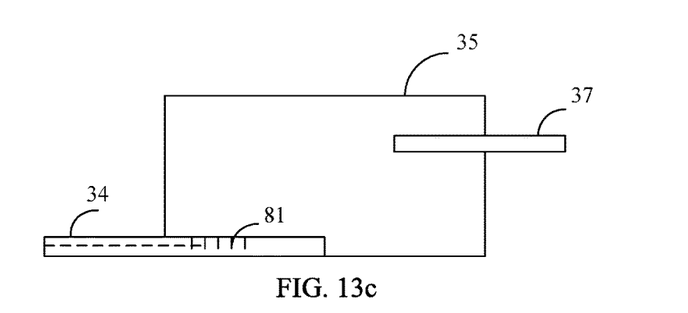
Figure 13D:
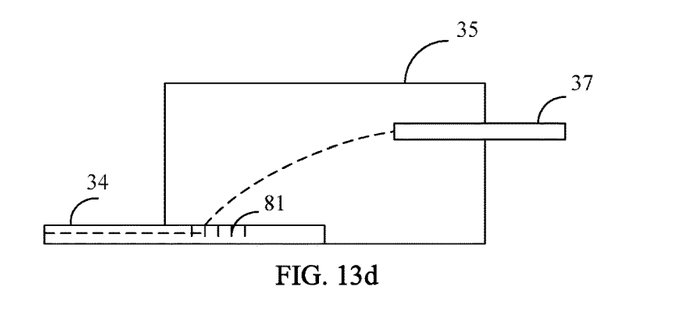

FIG. 13a to FIG. 13d are schematic diagrams of an encapsulation process for coupling between an optical fiber and an optical chip according to an embodiment of the present disclosure. An encapsulation process for coupling between the optical fiber 37 and the optical chip 34 shown in FIG. 7 is as follows: As shown in FIG. 13a, a hole is formed in the waveguide substrate 35, as shown in the dashed line box in the figure, to secure the optical fiber. The waveguide substrate 35 may be produced by using glass, crystal, or the like, and the waveguide substrate is referred to as an optical writing waveguide block after an optical waveguide is formed in the waveguide substrate. As shown in FIG. 13b, the optical fiber 37 is encapsulated into the hole in the waveguide substrate 35. As shown in FIG. 13c, after alignment at a mark point, the waveguide substrate 35 on which the optical fiber is secured is coupled to the optical chip 34 by means of gluing, soldering, or the like. As shown in FIG. 13d, after locating by means of three-dimension vision, the optical waveguide is etched in the waveguide substrate 35, to implement optical coupling between the optical fiber 37 and the optical chip 34. In FIG. 13d, the optical fiber 37 and the optical chip 34 are connected to each other by using a grating 81, and coupled to each other in a GC coupling manner. In this embodiment, the optical waveguide may be alternatively first etched in the waveguide substrate 35, and then encapsulation for coupling between the optical writing waveguide block 35 and the optical chip 34 is implemented.

In this embodiment of the present disclosure, first, the waveguide substrate and the optical fiber are encapsulated and the waveguide substrate and the optical chip are encapsulated, and then the optical waveguide is written into the waveguide substrate, so that a parameter of the optical waveguide can be flexibly designed, and one optical writing waveguide block can be compatible with different coupling manners.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical coupling apparatus, wherein the optical coupling apparatus comprises:
   a first optical chip that performs an optical-to-electric signal conversion, an electric-to-optical signal conversion or a combination thereof, a second optical chip that performs an optical-to-electric signal conversion, an electric-to-optical signal conversion, or a combination thereof, and an optical writing waveguide block that selectively forms a waveguide, wherein
   the first optical chip is coupled to the optical writing waveguide block in a first coupling manner, and the second optical chip is coupled to the optical writing waveguide block in a second coupling manner; and
   an interface of the first optical chip is optically interconnected to an interface of the second optical chip by an optical waveguide formed by the optical writing waveguide block.

2. The optical coupling apparatus according to claim 1, wherein the first coupling manner and the second coupling manner each comprises any one or more of an adiabatic coupler (AC), a grating coupler (GC), or an edge coupler (EC).

3. The optical coupling apparatus according to claim 2, wherein the optical writing waveguide block is disposed on an upper surface of the first optical chip and/or the second optical chip.

4. The optical coupling apparatus according to claim 2, wherein the optical writing waveguide block is at least partially disposed between the first optical chip and the second optical chip.

5. The optical coupling apparatus according to claim 1, wherein the optical coupling apparatus further comprises an electric substrate;
   the first optical chip and the second optical chip are disposed on a surface of the electric substrate; and
   the first optical chip is electrically interconnected to the electric substrate, and the second optical chip is electrically interconnected to the electric substrate.

6. The optical coupling apparatus according to claim 5, wherein the optical writing waveguide block is at least partially disposed inside the electric substrate.

7. The optical coupling apparatus according to claim 5, wherein the optical writing waveguide block is disposed on an upper surface of the first optical chip and/or the second optical chip.

8. The optical coupling apparatus according to claim 5, wherein the optical writing waveguide block is at least partially disposed between the first optical chip and the second optical chip.

9. The optical coupling apparatus according to claim 1, wherein the optical writing waveguide block is disposed on an upper surface of the first optical chip and/or the second optical chip.

10. The optical coupling apparatus according to claim 1, wherein the optical writing waveguide block is at least partially disposed between the first optical chip and the second optical chip.

11. An optical coupling apparatus, wherein the optical coupling apparatus comprises:
- an optical chip, an optical writing waveguide block, an optical fiber, wherein
- the optical chip is coupled to the optical writing waveguide block in a first coupling manner, and the optical fiber is coupled to the optical writing waveguide block in a second coupling manner, wherein the optical chip performs an optical-to-electric signal conversion, an electric-to-optical signal conversion or a combination thereof, and the optical writing waveguide block selectively forms a waveguide; and
- an interface of the optical chip is optically interconnected to the optical fiber by an optical waveguide formed by the optical writing waveguide block.

12. The optical coupling apparatus according to claim 11, wherein the first coupling manner comprises any one or more of an adiabatic coupler (AC), a grating coupler (GC), or an edge coupler (EC).

13. The optical coupling apparatus according to claim 12, wherein the optical writing waveguide block is at least partially disposed on an upper surface of the optical chip.

14. The optical coupling apparatus according to claim 11, wherein the second coupling manner comprises an EC.

15. The optical coupling apparatus according to claim 14, wherein the optical writing waveguide block is at least partially disposed on an upper surface of the optical chip.

16. The optical coupling apparatus according to claim 11, wherein the optical coupling apparatus further comprises an electric substrate; and
- the optical chip is disposed on a surface of the electric substrate, and the optical chip is electrically interconnected to the electric substrate.

17. The optical coupling apparatus according to claim 11, wherein the optical writing waveguide block is at least partially disposed on an upper surface of the optical chip.

18. An optical coupling method, wherein the method comprises:
- emitting an optical signal from a first optical chip, and coupling the optical signal to an optical writing waveguide block in a first coupling manner, wherein the optical writing waveguide block selectively forms a waveguide; and
- emitting the optical signal from the optical writing waveguide block, and coupling the optical signal to a second optical chip in a second coupling manner using an optical waveguide formed by the optical writing waveguide block.

19. The method according to claim 18, wherein the first coupling manner and the second coupling manner each comprises any one or more of an adiabatic coupler (AC), a grating coupler (GC), or an edge coupler (EC).

* * * * *